Figure 1:
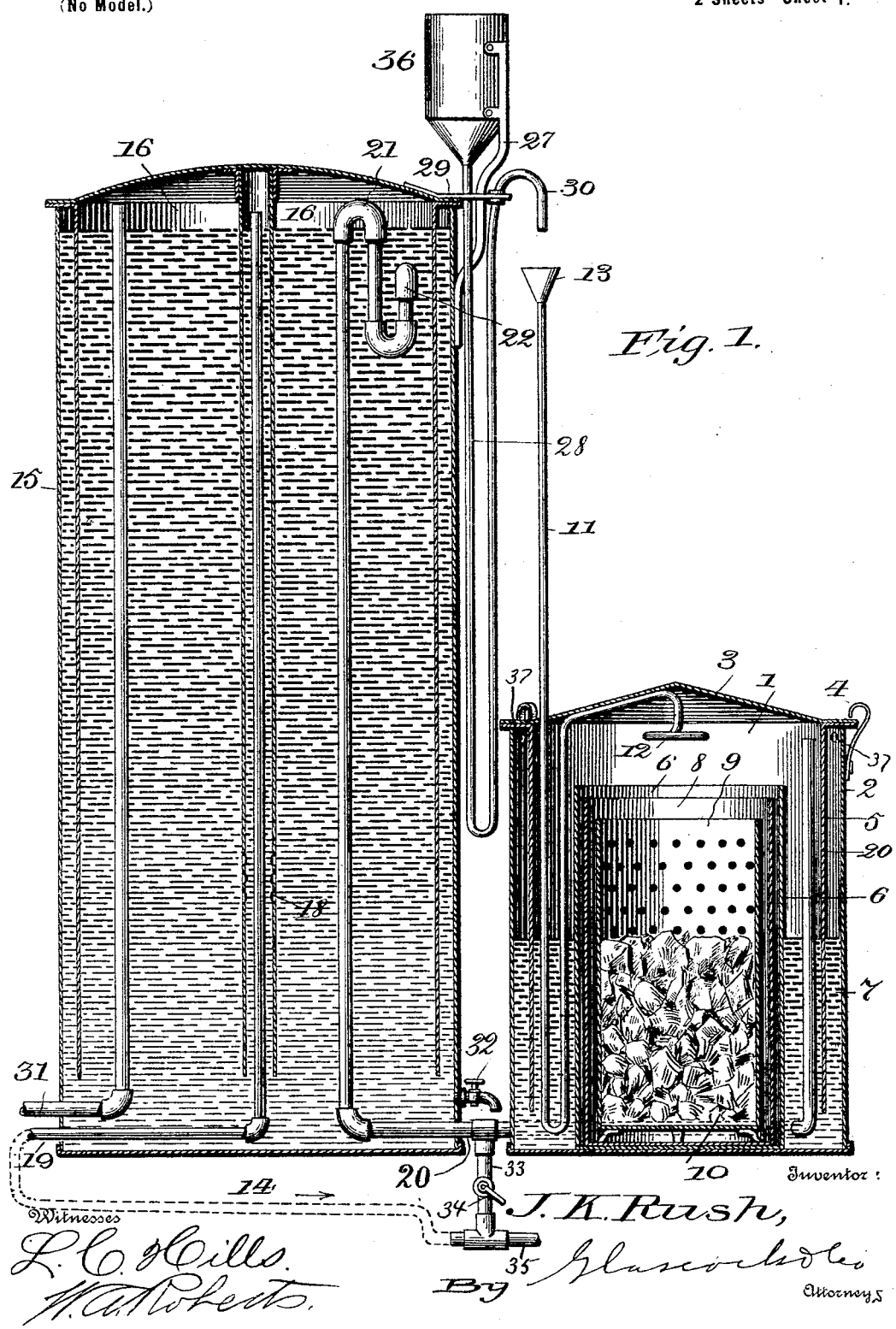

No. 633,045. Patented Sept. 12, 1899.
J. K. RUSH.
ACETYLENE GAS GENERATOR.
(Application filed Oct. 27, 1898.)
(No Model.) 2 Sheets—Sheet 1.

No. 633,045. Patented Sept. 12, 1899.
J. K. RUSH.
ACETYLENE GAS GENERATOR.
(Application filed Oct. 27, 1898.)
(No Model.) 2 Sheets—Sheet 2.
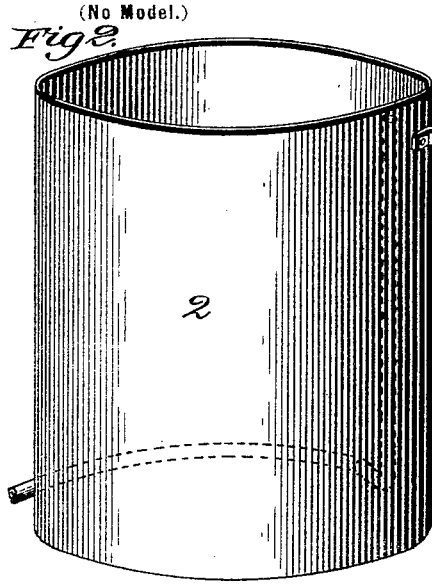
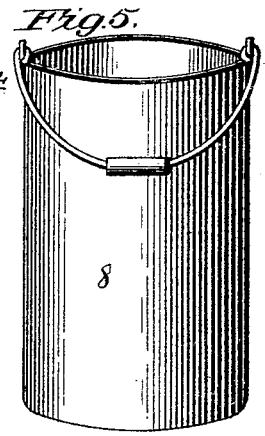
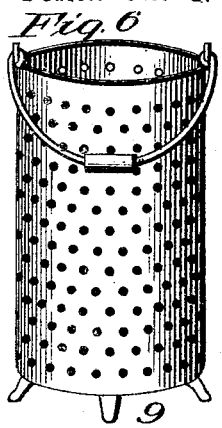
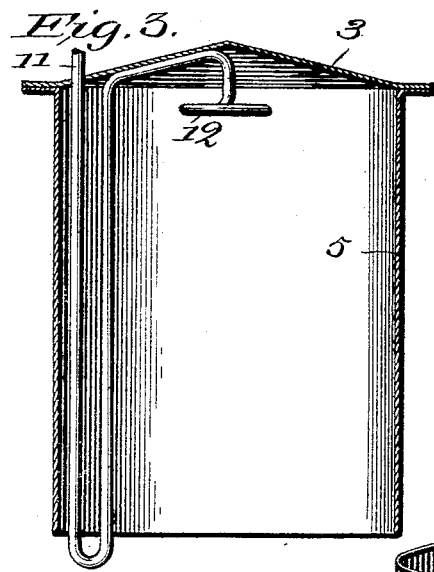
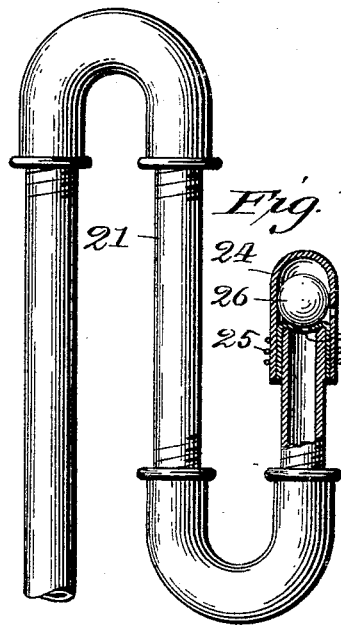
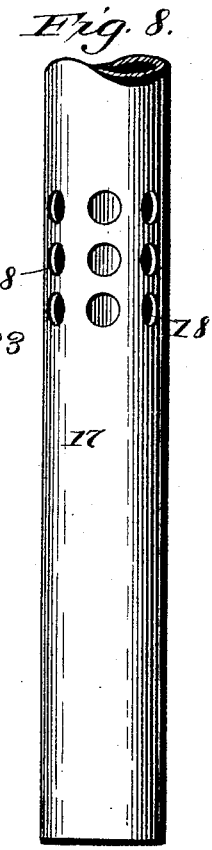
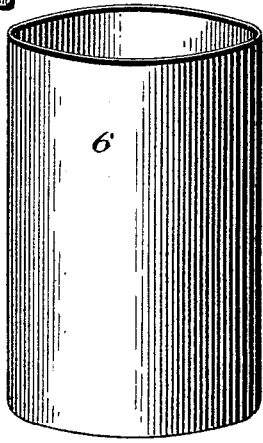
Witnesses
L. C. Hills.
W. A. Robert.
Inventor:
J. K. Rush,
By Gluscvikds
Attorneys

UNITED STATES PATENT OFFICE.

JOSEPH KENARD RUSH, OF CANANDAIGUA, NEW YORK.

ACETYLENE-GAS GENERATOR.

SPECIFICATION forming part of Letters Patent No. 633,045, dated September 12, 1899.

Application filed October 27, 1898. Serial No. 694,725. (No model.)

*To all whom it may concern:*

Be it known that I, JOSEPH KENARD RUSH, a citizen of the United States, residing at Canandaigua, in the county of Ontario and State of New York, have invented certain new and useful Improvements in Acetylene-Gas Machines; and I do hereby declare the following to be a full, clear, and exact description of the invention, such as will enable others skilled in the art to which it appertains to make and use the same.

My invention relates to certain new and useful improvements in acetylene-gas apparatus, and has for its object to produce a device which will quickly and efficiently generate acetelyne gas and store same until ready for use.

With these and other objects in view my invention further consists in the novel details of construction, combination, and arrangement of parts to be fully described in the following specification and set forth in the claims.

Referring to the accompanying drawings, forming a part of this specification, Figure 1 is a central vertical sectional view of my apparatus. Fig. 2 is a perspective view of the generator-casing; Fig. 3, a central view of the cover for the generator. Fig. 4 is a perspective of the vessel; Fig. 5, a perspective of the bucket; Fig. 6, a perspective of the perforated basket; Fig. 7, an elevation of the delivery-pipe end, showing the ball-valve sectioned; and Fig. 8 is a detail view of the lower end of the safety-pipe casing.

In the drawings, 1 is the generator formed of a casing 2, having a cover 3 secured thereto by suitable catches 4. Said cover has a depending hollow cylinder 5, extending within the casing and nearly to the bottom thereof. A vessel 6 rests on the bottom of the casing in the center thereof and is of sufficient weight to retain its position at all times though surrounded by the water 7, which half fills the generator-casing, or the said vessel 6 may be soldered or made stationary in the bottom of the casing in any other manner desired. A bucket 8, provided with a bail-handle, rests within the vessel 6, and in turn contains a perforated basket 9 for calcium carbid 10, also having a bail-handle and supported on legs to elevate it from the bottom of the vessel, for a purpose hereinafter described. A feed-tube 11 passes through the cover 3 and down nearly to the bottom of the casing, then upward, forming a U-bend, then along the cover to the center thereof, then downward, and has formed on its end a circular spray 12, which hangs directly above the carbid. The other end of the feed-tube extends upward for some distance and terminates in a funnel 13. The reservoir 14 consists of a casing 15, nearly filled with water and covered with a gas-dome 16, which has depending from its center a safety-pipe casing 17, provided with apertures 18 near its lower end and adapted to surround the safety-pipe 19, which passes through the bottom of the reservoir-casing and nearly to the top thereof above the water-surface. A delivery-pipe passes through the lower parts of the generator and reservoir casings and has one end located near the cover of the generator and the other end formed in an S-trap 21, which has one bend above the level of the water in the reservoir and a ball-valve 22 at the mouth of the other bend beneath the water. The valve 22, as shown in Fig. 7, is formed by an elastic diaphragm 23, of rubber or the like, stretched over the mouth of the pipe with an opening in its center and a hood 24 bound over same with a wire 25, forming a compartment above the diaphragm, which contains a ball 26 and an opening near its lower part. It will be readily seen that as long as the pressure within the pipe is greater than that without the ball 26 will be forced away from the diaphragm and the gas allowed to pass out through the openings in the diaphragm and escape through the water to the dome; but should the pressure outside become greater than that inside the ball would be forced upon the flexible diaphragm to close the opening therein and prevent any passage to the pipe. In case of any accident, such as the wearing of the diaphragm, though the water might possibly enter the pipe it will be prevented from gaining access to the generator by means of the S-trap, which, as above stated, extends above the level of the water for this purpose. A water-supply tank 36 is supported above the reservoir-casing by means of a bracket 27, and has leading therefrom the flexible tube 28, which hangs in a loop and is secured at its other end by an arm 29, projecting from the dome 16, where it is bent to form a gooseneck 30, that will always be directly above the funnel 13, so that when water drips therefrom it will enter the feed-tube 11. By this arrangement as long as the mouth of the gooseneck 30 is below the level of the water in the supply-tank 36 the said water will run through the flexible pipe and out of the gooseneck into the feed-tube, and thus supply water to the carbid, but as soon as the pressure within the reservoir has become great enough to elevate the dome and carry with it the gooseneck 30 so far that the mouth of the gooseneck is above the level of the water in the supply-tank the water will cease to flow from said gooseneck. A service-pipe 31 enters the reservoir-casing at its lower part and passes upward, terminating within the dome above the water-level. The faucet 32 is located in the lower part of the reservoir-casing for the purpose of withdrawing the water from said reservoir when desired.

From the foregoing it will be seen that while the dome of the reservoir is in the position as shown in Fig. 1, water will run from the supply-tank and be fed onto the carbid, thereby generating the acetylene gas, which can only escape through the pipe 20 into the reservoir. As its pressure increases it raises the dome and remains there until withdrawn through the service-pipe 31. As above described, the supply of water to the carbid is cut off automatically when the dome is elevated a short distance, then the water already in the feed-tube 11 is sufficient to generate enough gas to fill the reservoir, and if the pressure becomes too great in said reservoir the perforations 18 in the safety-pipe casing are brought above the level of the water, so as to allow the surplus gas in the dome to travel through said perforations and enter the safety-pipe 19 to be discharged into the air. The back pressure within the generator is checked by the water contained in the U portion of the feed-tube 11, which forms a water seal, and the gas within the generator is prevented from escaping between the casing and cover by means of the water seal formed by the depending hollow cylinder 5 of the cover. When the carbid has become exhausted, the catches 4 are released and cover 3 withdrawn, when the bucket 8 can be removed by its bail-handle, leaving the vessel 6 in its place. Thus the water 7 is not disturbed by the removal of the carbid, and the basket with the deposited powder, as well as the remaining lump carbid is removed, the parts cleaned, the baskets refilled and placed in their normal positions again, when it is but necessary to replace the cover 3, and the apparatus is recharged and ready for use.

It is to be noted that the arrangement of the carbid within a perforated basket elevated from the bottom of the vessel permits the action of the water on the under part of the carbid by the accumulated water, as well as that which is sprayed thereby, making use of all the carbid without waste.

It is obvious that my invention, because of its cheapness of construction and ease of handling, is adapted for use in private residences or other places where a gas-generator is required which will automatically care for itself without the attention of an expert tender.

The pipe 33 connects with the pipe 20, as shown in Fig. 1, the said pipe 33 being provided with a valve 34, the pipe 33 connecting with the exhaust-pipe 35, as does also the safety-pipe 19. Thus it will be seen that should it be desired to remove the top of the generator the valve 34 may be opened and air can rush in under the said top through pipes 35, 33, and 20, thus facilitating the removal of the top, which would otherwise be held down by suction. Also in replacing the cover the air is ejected through same pipes without forcing air into the gasometer. The valve 34 is then closed in order to prevent gas from escaping through pipe 35 during the process of manufacture. The perforations 37 are located near the upper edge of the generator-casing 2 and are adapted to permit the water in the said casing to escape if the pressure of gas in the generator should be abnormal and force the water up against the inner sides of the casing 2.

Having thus described my invention, what I claim as new, and desire to secure by Letters Patent, is—

1. In a device of the character described, a reservoir composed of a casing containing water, a dome fitting therein, a delivery-tube entering the casing and adapted to supply gas to the dome, a safety-pipe casing having perforations in the lower part thereof and secured to the dome, a safety-pipe entering the casing of the reservoir passing through the safety-pipe casing and terminating above the level of the water, an S-trap formed on the upper end of the delivery-pipe with one bend above the level of the water a check-valve on the other end of the trap located beneath the level of the water, and a service-pipe leading from the dome.

2. In a device of the character described, a pipe a perforated diaphragm covering the end thereof, a hood incasing the diaphragm, forming a compartment therewith and provided with an opening in its lower part, and a ball located within said compartment, substantially as described.

3. In a device of the character described, a generator-casing containing water, a vessel resting therein, a bucket within the vessel, a perforated carbid-basket supported by legs within the bucket so as to be elevated from the bottom thereof, a cover for the generator-casing having a depending hollow cylinder surrounding the vessel and partly submerged in the water, catches securing said cover in place, a vertical feed-tube passing through the cover, forming a U-bend and having its end bent to form a circular spray directly above the carbid-basket, a reservoir-casing containing water, a movable dome fitting therein, a delivery-tube passing through the casings of the generator and reservoir and having one end terminating in the space within the cover of the generator and above the water and the other end formed into an S-trap with one bend above the water of the reservoir and a submerged check-valve at the opening of the other, a water-supply tank suitably supported on the reservoir-casing, an arm extending from the dome, a flexible tube leading from the water-supply tank forming a loop which is supported at its end by said arm, said tube having a gooseneck end adapted to discharge above the feed-tube of the generator, a safety-pipe casing depending from the dome and having perforations in the lower part thereof, a safety-pipe entering the casing of the reservoir, passing through the safety-pipe casing and terminating above the level of the water, a service-pipe passing through the casing of the reservoir and terminating in the dome above the level of the water, and a faucet leading from the lower part of the reservoir-casing.

4. In a reservoir of the character described, a delivery-pipe passing therethrough an S-trap formed on the end of the delivery-pipe with one bend above the level of the liquid of the reservoir, and a submerged check-valve on the other end of the trap, substantially as described.

In testimony whereof I affix my signature in presence of two witnesses.

JOSEPH KENARD RUSH.

Witnesses:
CHAS. IRVING BALDWIN,
CHAS. SEARS PARMELE.